United States Patent [19]

Espenscheid et al.

[11] 4,207,117

[45] Jun. 10, 1980

[54] ASPHALTIC COMPOSITIONS

[75] Inventors: Wilton F. Espenscheid, Princeton; Tsoung Y. Yan, Trenton, both of N.J.

[73] Assignee: Mobil Oil Corporation, New York, N.Y.

[21] Appl. No.: 623,273

[22] Filed: Oct. 17, 1975

[51] Int. Cl.² .................................................. C08L 95/00
[52] U.S. Cl. .................................. 106/278; 106/273 R; 106/279; 208/45; 208/23; 208/22
[58] Field of Search .................. 106/278, 279; 208/45, 208/22, 23

[56] References Cited

U.S. PATENT DOCUMENTS

| | | | |
|---|---|---|---|
| 2,415,697 | 2/1947 | Knowles et al. | 106/278 X |
| 3,476,679 | 11/1969 | Fauber | 208/45 |
| 3,540,906 | 11/1970 | Fauber | 106/278 |
| 3,567,475 | 8/1966 | Rostler | 106/278 |
| 3,725,240 | 4/1973 | Baum | 208/76 |
| 3,940,281 | 2/1976 | Corbett | 106/278 |

*Primary Examiner*—Carman J. Seccuro
*Attorney, Agent, or Firm*—Charles A. Huggett; Raymond W. Barclay; Howard M. Flournoy

[57] ABSTRACT

Asphalt compositions are provided containing a ductility improving amount of a refinery stream obtained in the form of a bottoms fraction from a thermofor catalytic cracking or fluid catalytic cracking operation.

4 Claims, No Drawings

ASPHALTIC COMPOSITIONS

BACKGROUND OF THE INVENTION

1. Field of the Invention

This invention relates to asphalt compositions and relates more particularly to asphalt compositions having improved ductility characteristics.

2. Description of the Prior Art

As a measure of the ductility of asphalt binding agents or cements in service, the decrease in ductility upon oxidation is the most important product specification and the most difficult one to meet. In the past, one of the approaches to improving asphalt in this respect was to add antioxidants. The other was to utilize high naphthenic crudes for such purpose. Neither approach has proven entirely satisfactory.

SUMMARY OF THE INVENTION

In accordance with the present invention, we have found that the addition of minor amounts of the refinery stream obtained in the form of a bottoms fraction from a thermofor catalytic or fluid catalytic cracking operation (hereinafter referred to as "syn tower bottoms") improves the quality of the asphalt greatly, i.e. these streams reduce the decrease in ductility and also reduce the increase in viscosity upon oxidation. If so desired, these streams (syn tower bottoms) may be added to the asphalt either before or after air-blowing.

More specifically, it is found that the above-described bottoms fractions are excellent solvents for asphaltenic materials. Experimentation has shown that these solvents break the asphaltenic miscelles and swell and peptize the asphaltenes to modify the rheology. It is also found that the solvents also coat the asphaltene molecules and act as protective shields to prevent further oxidation of the asphaltenes, resulting in a preservation of the ductility. In this respect, it is known to those skilled in the art that deterioration of the asphalt is the result of excess oxidation during service.

In the more specific aspects of the present invention, the aforementioned refinery streams (syn tower bottoms) are employed in any minor amount which is sufficient to improve the ductility of the asphalt, as hereinbefore indicated. In most applications, these bottoms fractions are employed in an amount from about 0.5% to about 45%, and preferably from about 1.0% to about 20%, by weight, of the total weight of the asphaltic composition.

In particularly preferred representative asphaltic compositions, the asphalt subjected to ductility improvement is a standard ASTM viscosity grade of AC-10, and the bottoms fraction is obtained from a fluid catalytic cracking operation characterized by an initial boiling point of about 750° F. As previously indicated, the asphaltic composition may be subjected to air-blowing either before or after the addition of the bottoms fraction.

More specifically, in one of the aspects of the invention, the syn tower bottoms fraction is derived, for example, from the catalytic cracking of gas oil at a temperature above 750° F. in the presence of solid porous cracking catalyst. In this process, the effluenet of the cracking operation is fractionated to separate therefrom a cycle stock boiling predominantly above 550° F. This cycle stock is then cracked at elevated temperatures in the absence of a cracking catalyst for a time such that the portion of the resultant vis-broken cycle stock boiling at about 750° F. has a saturates content not higher than about 12%, by weight, as determined by chromatographic analysis. The vis-broken cycle stock is then fractioned to provide a bottoms fraction thereof boiling above about 750° F. A more complete description for obtaining the aforementioned bottoms fraction from the catalytic cracking operation and subsequent air-blowing thereof is described in commonly assigned U.S. Pat. No. 3,725,240, issued Apr. 3, 1973.

DESCRIPTION OF SPECIFIC EMBODIMENTS

The following examples and comparative data will serve to illustrate the marked degree in ductility improvement of the asphaltic composition to which have been added bottoms fractions from thermofor catalytic cracking or fluid catalytic cracking operations, designated as syn tower bottoms. The asphalt employed was a standard ASTM viscosity grade of AC-10. The syn tower bottoms fraction was obtained from a fluid catalytic cracking operation characterized by a boiling range of about 700° F. to about 1000° F., by weight, level, in accordance with the process previously described.

In carrying out the testing operation, appropriate amounts of the asphalt and syn tower bottoms were blended with heating to 300° F. Viscosity, ductility and penetration were determined at appropriate temperatures before and after being subjected to a Thin Film Oven Test (ASTM Test D 2872) designated as TFOT. This is a test in which a moving film of asphaltic material is heated in an oven for 75 minutes at 325° F. with intermittent blowing of air. The amount of hardening is determined from physical tests.

TABLE

| Composition | 1 | 2 | 3 |
|---|---|---|---|
| Asphalt, wt. % | 100 | 95 | 90 |
| Syn Tower Bottoms, wt. % | 0 | 5 | 10 |
| Product Inspection | | | |
| Before TFOT: | | | |
| Viscosity, 140° F., poise | 1,109 | 557 | 323 |
| Ductility 25° C., 5 cm/min. | 100 | 89 | 63 |
| Penetration 100 gm. 5 sec. | 66 | 114 | 169 |
| After TFOT: | | | |
| Viscosity 140° F., poise | 16,454 | — | 2,987 |
| Ductility 25° C., 5 cm/min. | 7.8 | 14.0 | 40.0 |
| Quality Change | | | |
| Vis. after/vis. before, % | 1,484 | — | 925 |
| Ductility after/ductility before, % | 7.8 | 15.7 | 63.5 |

As will be noted from the examples and comparative data of the foregoing table, the presence of the syn tower bottoms results in reduction of decrease in ductility and reduction of increase in viscosity of the asphaltic composition.

While this invention has been described with reference to preferred compositions and components therefor, it will be understood by those skilled in the art that departure from the preferred embodiments can be effectively made and are within the scope of the specification.

We claim:

1. An asphaltic composition consisting essentially of asphalt having an ASTM viscosity grade of AC-10 and a ductility improving amount of a refinery stream obtained in the form of a bottoms fraction from a thermofor catalytic cracking or fluid catalytic cracking operation characterized by an initial boiling point of about 750° F. wherein said bottoms fraction is present in an amount of from about 0.5% to about 45% by weight of the total weight of said asphaltic composition.

2. The asphaltic composition of claim 1 wherein said asphaltic composition has been subjected to air-blowing prior to the addition of said bottoms fraction.

3. The asphaltic composition of claim 1 wherein said asphaltic composition has been subjected to air-blowing following the addition of said bottoms fraction.

4. The asphaltic composition of claim 1 wherein said bottoms fraction is present in an amount from about 1.0% to about 20%, by weight, of the total weight of said asphaltic composition.